Dec. 27, 1932.  F. G. HODSDON  1,891,983
PULSATOR FOR MILKING MACHINES
Filed Nov. 6, 1930  3 Sheets-Sheet 1
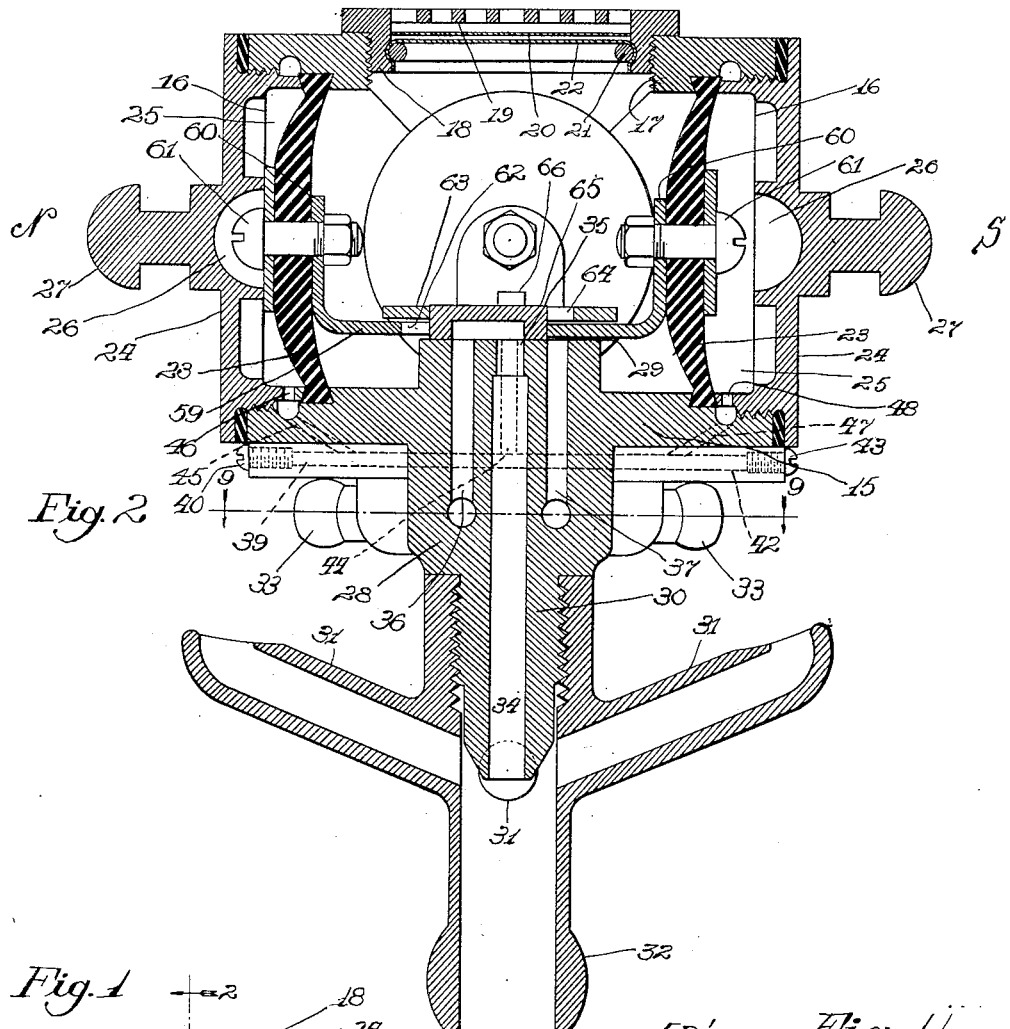
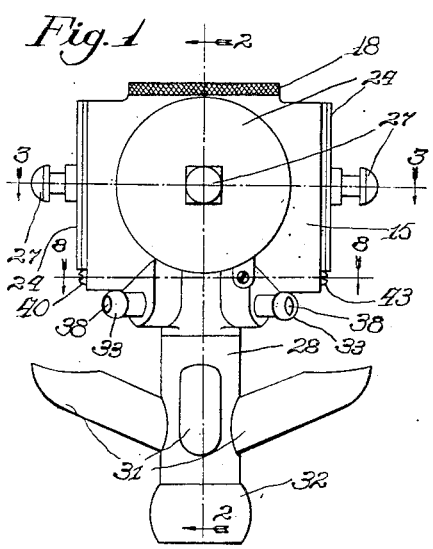
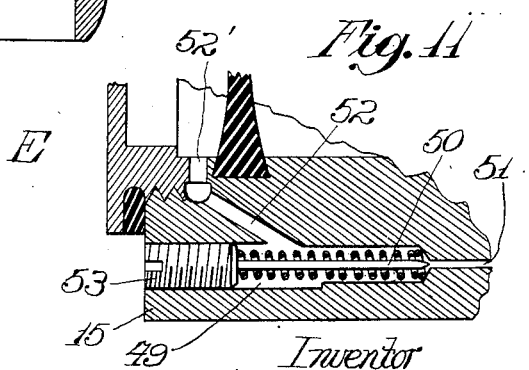
Inventor
Floyd G. Hodsdon
By N. P. Doolate
Atty.

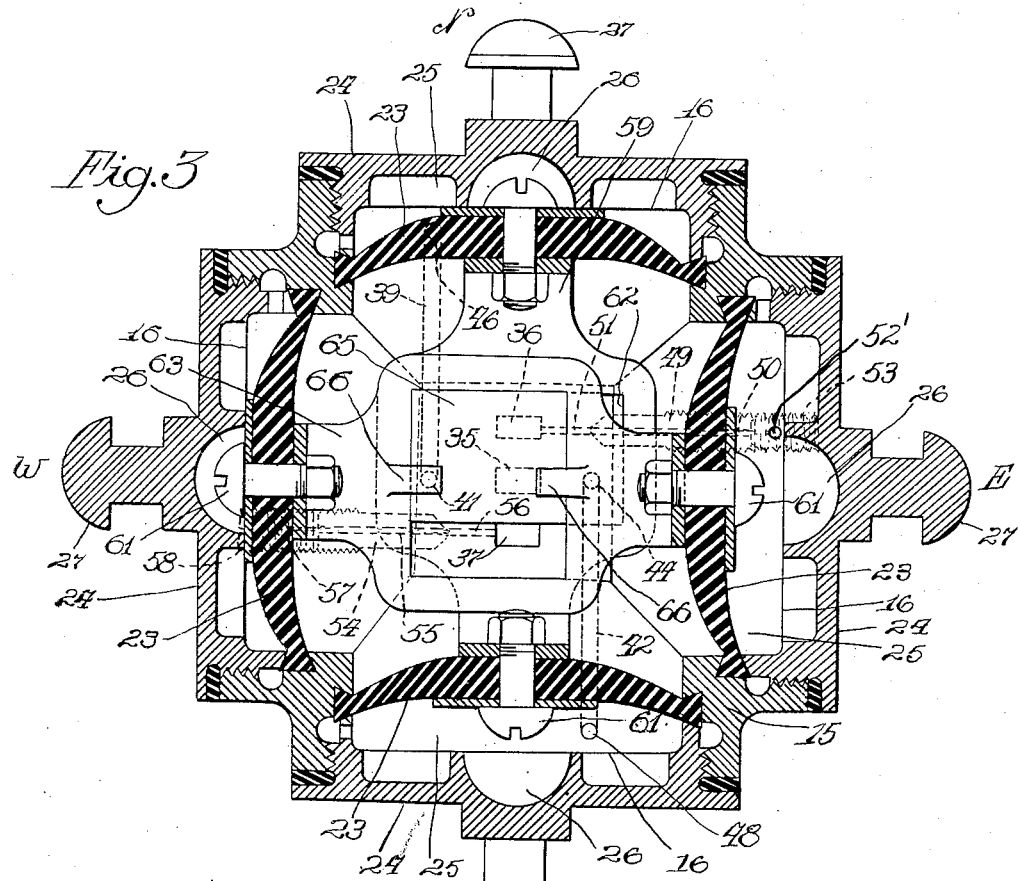
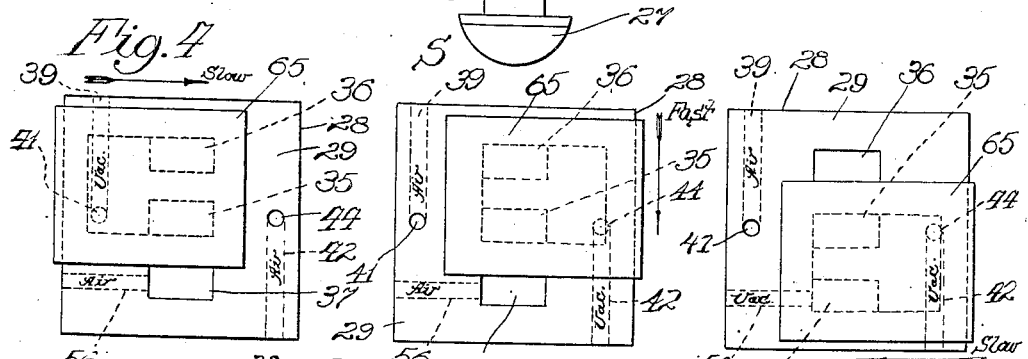
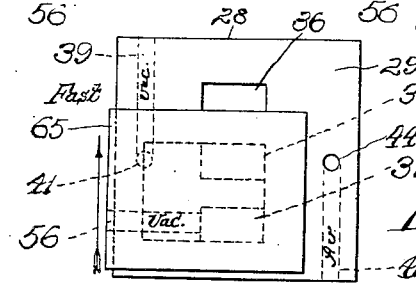

Dec. 27, 1932.  F. G. HODSDON  1,891,983
PULSATOR FOR MILKING MACHINES
Filed Nov. 6, 1930  3 Sheets-Sheet 3
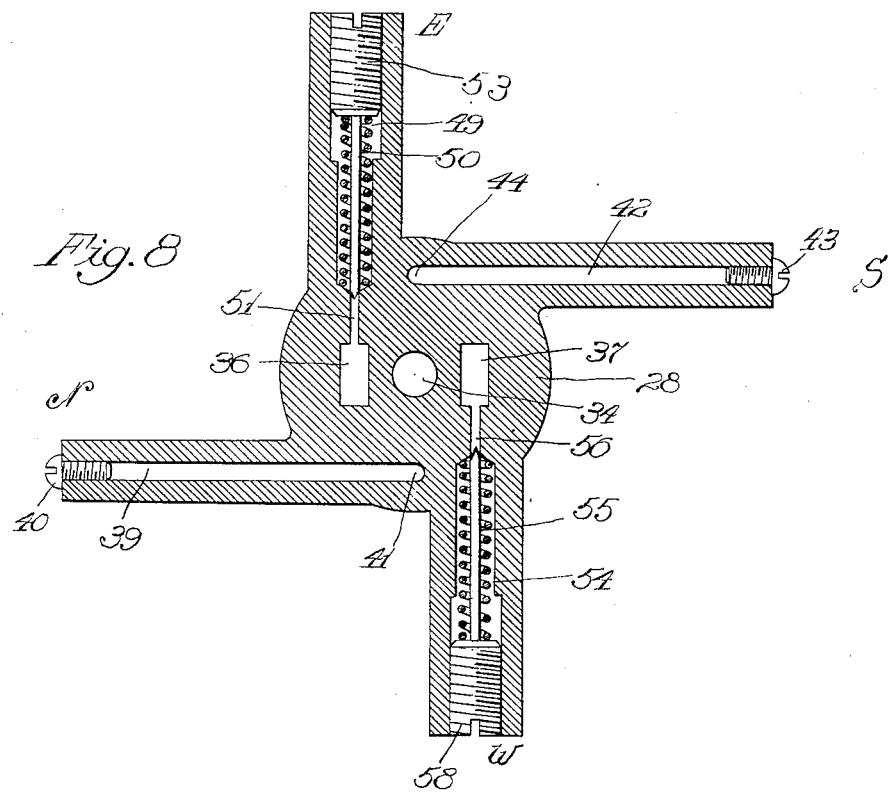
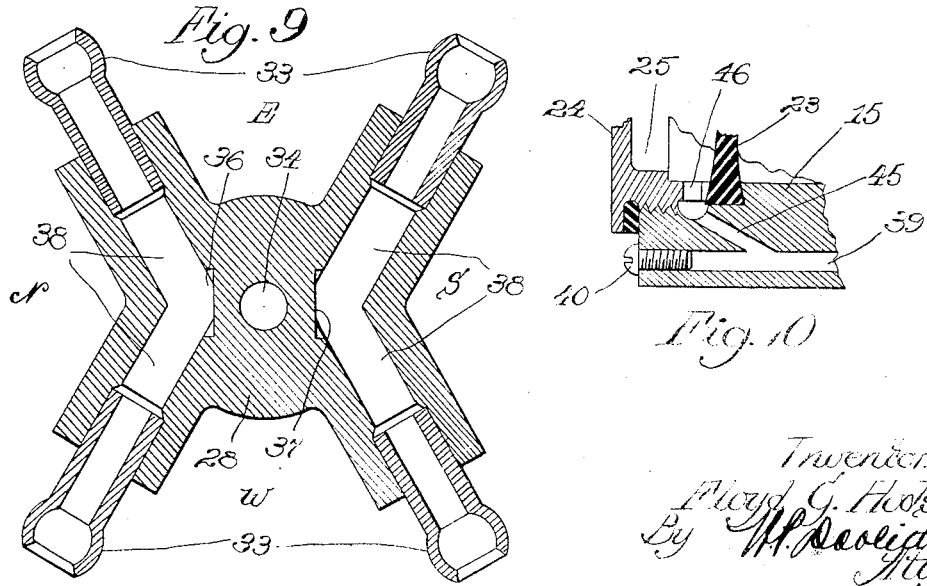

Patented Dec. 27, 1932

1,891,983

UNITED STATES PATENT OFFICE

FLOYD G. HODSDON, OF LA GRANGE, ILLINOIS, ASSIGNOR TO INTERNATIONAL HARVESTER COMPANY, A CORPORATION OF NEW JERSEY

PULSATOR FOR MILKING MACHINES

Application filed November 6, 1930. Serial No. 493,717.

The invention resides in an improved construction of pulsator for use primarily in milking machines of the type employing one or two clusters of teat cups of the well known double-chambered variety. The energy utilized to manipulate the rubber liners contained in these cups is supplied by a vacuum pump which is in communication with the pulsator and a milk receiver pail, the function of the said pulsator being, as is well known in this art, to produce the alternate vacuum and release to atmosphere with'n the teat cups whereby to cause the milking action, there being connections from the teat cups to lead the milk through a claw, which may carry the pulsator, and thence through appropriate hoses to convey the milk to the milk receiver pail.

Most conventional pulsators as now known use leather faced pistons reciprocable with'n a cylinder. Such pistons must be oiled to keep them air tight. It has been found that this oil catches and accumulates dust particles, which eventually clog and seal associated ports and passageways in a manner interfering with, if not entirely preventing operation of the pulsator. Temperature changes also affect the operation of oiled pistons because of a varying friction between the parts resulting from viscosity change in the oil. Obviously, then, the use of oil in such pulsators is highly objectionable. Furthermore, the leathers harden if accidentally wetted by water, causing leakage. These piston types also usually employ a spring tripping device necessitating the use of small bearings wh'ch eventually wear and cause sluggishness in the pulsator action, and complicate manufacture. Such structure, of course, involves too high manufacturing cost.

With these objections noted, the problem is to provide a pulsator having none of these disadvantages.

Accordingly, the primary objects of this invention are to provide an improved pulsator having a minimum number of movable parts; to provide a pulsator which at no time requires oiling; to provide a pulsator of compact design and symmetrical appearance, and which may be manufactured at a reasonable cost; to provide a pulsator capable of easy assembly and tearing down without requir'ng special tools for the purpose; to provide a pulsator producing strong and definite pulsations; and, lastly generally to provide an improved pulsator for the purpose stated.

Other objects will, of course, become apparent to those skilled in this art as the disclosure continues.

Briefly, such important objects may be achieved by the illustrative example of the invention shown in the accompanying sheets of drawings, in which the pulsator has a hollow, cube-shaped body carrying a diaphragm to form a diaphragm chamber on each of the four sides presented by the body. These diaphragms are arranged in opposed pairs so that each pair may be connected to a sl'de member in such a manner that the two slides are slidable crosswise of each other to control the movement of a single valve slide. The action causes clockwise movement of the single slide valve in a rectilinear path whereby to control porting of air and vacuum and distribution thereof to the teat cups to effect the milking operation in a manner more fully to be described later.

So much will suffice for the present in giving a general idea of the pulsator structure, a practicable form of which is illustrated in the accompanying sheets of drawings, wherein the pulsator is shown located on the teat cup claw for purposes of illustrat:on, rather than on the milk receiver pail cover, as in some milking machines. Obviously, the pulsator can, in a convent:onal manner, also be carried on the milk pail, if desired. In these drawings:

Figure 1 is a general elevational view of the pulsator on a somewhat reduced scale;

Figure 2 is an enlarged, central, vertical sectional view along the line 2—2 shown in Figure 1, looking in the indicated direction;

Figure 3 is a horizontal sectional view through the pulsator, as seen along the line 3—3 of Figure 1 looking in the direction of the arrows;

Figures 4, 5, 6 and 7 are views, respectively, showing the four positions assumed by the single valve member and the path traveled thereby rectilinearly in a clockwise direction;

Figure 8 is a horizontal section along line 8—8 shown in Figure 1;

Figure 9 is another horizontal sectional view, as seen along the line 9—9, appearing in Figure 2;

Figure 10 is an enlarged fragmentary detail view, showing in section some of the ports and passageways; and, Figure 11 is a view similar to Figure 10 but showing other ports and passageways.

As best shown in Figures 1, 2 and 3, the pulsator body 15 comprises an integrally formed frame in hollow cube form having four sides and a top, each formed with a large circular opening, the side openings appearing at 16 and the top opening, at 17, the latter being closed by a quickly detachable cover plate 18, to make possible ready access to and convenient inspection of the interior parts of the pulsator presently to be described. This cover plate includes a grate 19, to permit entry of atmospheric air into the pulsator body at all times. Beneath the grating, a screen 20 is arranged in the cap 18. Further, by means of a lock element 21, the cap carries beneath the screen 20, a fabric filter element 22. The screen and filter element combine to prevent entry of dust particles into the pulsator, as will be readily understood.

Each side opening 16 is closed by a circular, flexible diaphragm 23 preferably made of rubber or a rubberized fabric, the said diaphragms thus being disposed in opposite pairs, as best appears in Figures 2 and 3. These diaphragms 23 are secured in place by threaded caps 24. This arrangement provides oppositely disposed diaphragm chambers 25 for a purpose presently to appear. Each cap 24 has a recessed pocket 26 on its inner face and a trunnion 27 on its outer face. By means of these trunnions 27 a cluster of teat cups associated with the pulsator may be hung up when not in use.

The floor of the body includes a center portion 28, which projects upwardly a distance above the floor, to provide a smooth, polished base or rest 29. The center portion is extended downwardly a distance below the floor of the body, such extension terminating in a threaded stem 30, to which is threaded a claw presenting four nipples 31 in a conventional way, said nipples 31 each adapted to receive a hose that is in communication with the inner teat chamber of a teat cup, of which there are four, as is understood in this art. The claw 31 includes the usual downwardly extending nipple 32 adapted to receive a hose that supplies vacuum to the pulsator from a suitable source, as is understood by those skilled in this art. The portion 28 is appropriately tapped to receive four nipples 33, which connect by hose lengths with the outer chambers of the well known double chambered variety of teat cup.

A drilled passageway 34 is made vertically through the body portion 28, said passageway ending in a centrally disposed, rectangular port 35 in the polished rest 29. On each side of the center port 35 are vertical rectangular passages 36 and 37, each of which extends downwardly from the seat 29 to communicate with obliquely drilled passageways 38 that communicate with the nipples 33. As viewed in Figures 2 and 8, the front left hand end of the floor of the pulsator body is drilled to form a horizontal cross passage-way 39 closed at its outer or north end by a cap screw 40, while its inner end, disposed in the body portion 28, communicates with a vertical passage-way 41 that extends upwardly through the seat 29. Similarly, a horizontal cross passage-way 42, closed at its south end by a screw 43, is provided at the right hand rear part of the floor, said passage-way communicating with a vertical passage 44 that also extends upwardly through the seat 29. The passage-way 39, by means of a passage 45 (see Figures 2 and 10) through the body floor, and a passage 46, through adjacent cap 24, is in communication with the left hand or north diaphragm chamber 25. In the same way, by passages 47, 48, the passage 42 communicates with the right hand or south diaphragm chamber 25.

From the east end the floor of the body is formed with a bore 49 (see Figure 8) closed by an adjustable needle valve 50, which needle is operatively held in position by spring pressure to control the bore 49 that communicates at its inner end through a duct 51 with the passage 36. (See Figure 11.) At its outer or east end the bore 49 communicates with a passage 52 above the set screw 53, said bore 52 leading to a passage 52' that communicates with east diaphragm chamber 25. In this manner, passage 36 has communication with the east diaphragm chamber 25. From the west end, the floor of the body is formed with a bore 54 closed by an adjustable needle valve 55, which similarly controls bore 54 that communicates at its inner end through a duct 56 with the passage 37. At its outer or west end, the bore 54 communicates with a vertical passage 57 similar to passages 52, 52' already described, whereby communication is had with the east chamber 25. The distribution of air and vacuum through these various passages to the diaphragm chambers 25 must be controlled in such a manner that in the four teat cups two are drawing milk while the other two are released, and so on alternately. The mechanism which governs and regulates the porting to accomplish this result will now be described.

A crosswise reciprocatory slide frame 59 is provided, having upturned ends 60, respectively, fastened by bolts 61 to the north and south diaphragms 23, as appears in Figures 2 and 3. The mid-section of the slide 59, above the rest 29, is formed with a relatively large, rectangularly-shaped guide opening 62. Above the bottom slide 59 is arranged a similar, right angularly disposed slide frame 63, having its vertical end walls, respectively, connected in the same manner described to the east and west diaphragms 23, whereby said slide 63 reciprocates in an east-west direction. Similarly, this slide 63 has a relatively large, rectangularly shaped opening 64 in its mid-section lying above the opening 62. Embraced by these openings 62, 64 is a single porting control slide valve member 65, which is rectangularly formed as an inverted hollow block, slidably resting on the polished surface 29. The hollow block serves to connect passage 35 with either passage-way 41, 44 and 36 or 37 in a manner to be described presently. The top slide plate 63 is formed with lips 66, which serve to prevent dislocation of the control slide block from its seat 29. The openings 62, 64 function as guides to carry the block 65 slidingly in a rectilinear and/or right angular path on the seat 29 in a manner now to be described in connection with the operation of the improved pulsator, which will best be understood by a study of Figures 4 to 7, inclusive, to which attention is now particularly directed.

The vacuum, of course, is being continuously applied through nipple 32 to the passage-ways 34, 35, and to the milk nipples 31, whereby always to draw off and deliver the milk into the milk receiver pail, which is connected to the said nipple 32. Air for use in the pulsator is always available inside the pulsator body because the grating 19 provides continuous communication to atmosphere. The air, as has been explained, is filtered to eliminate dust particles which might clog the passage-ways and ports.

The slides 59, 63 move crosswise of each other along intersecting axes and in horizontal planes to guide and slide the valve slide block 65 in a clockwise direction and along a rectilinear path on its seat 29. Figures 4, 5, 6 and 7 show the four positions assumed by the single slide valve block and its direction of motion controlled by the two, double opposed, sets of flexible diaphragms. Valve movements of Figures 4 and 6 from east to west and vice versa are made slowly, the speed being controlled by setting the two needle valves 50 and 55 as desired. While these slow movements are being executed, two teat cups are drawing milk while the other two cups are released and so on alternately. The movements of the single valve slide block illustrated in Figures 5 and 7 from north to south and vice versa are very rapid, in fact, just about instantaneous.

To explain this action in more detail, let it be assumed that the showing in Figure 4 represents a starting position for the valve 65, where it rests in the northwest corner on the polished surface 29. In such position, it will be clear that vacuum from the line 32, 34 passes under the valve block 65 (see also Figure 2) and down passage 36 to be led to the two nipples 33 (see Figure 9), which communicate with passage 36 and with the two communicating leads 33 that communicate in turn with the outer teat cup chambers of two of the teat cups. The two corresponding milk leads 31 are, of course, also under vacuum and, therefore, the inner chamber of these same two teat cups is also under vacuum, creating a balanced or neutral, or released position of the two liners which causes milk to flow from these two teats. At the same instant passage 37 is being exposed to air, which is led to the other teat cup chambers of the remaining two teat cups through the other two or south leads 33 which causes the rubber liners to collapse and squeeze the teat and so preventing flow of milk and keeping up the blood circulation in the teats. But, when the valve 65 is in this northwest position, the air also goes through duct 56 past needle valve 55 and up through passage 57, and gets behind the diaphragm 23 into the west diaphragm chamber 25, while at the same instant vacuum goes from opening 35 underneath valve 65 and down passage 36, thence, through duct 51, by needle valve 50, up passages 52 and 52', and into the east diaphragm chamber 25. Obviously now, with vacuum in the east diaphragm chamber and air in the west diaphragm chamber, these opposed diaphragms must both flex toward the east and, in so doing, must slide the part 63 to the east. Now, since block 65 is arranged in the opening 64 of the slide 63, the block is guided and moved by said opening with the slide 63 to the east. This movement from west to east will be made slowly, because the ducts 51 and 56 are restricted the necessary amount by the adjustable needle valves 50 and 55, respectively, through the adjustable screws 53 and 58, respectively.

Now, the single valve block 65 is in the northeast position on the rest 29, as shown in Figure 5. In this position of the parts, vacuum still travels from opening 35 down passage 36 to the two north leads 33 which go to the outer teat cup chamber to supply vacuum thereto. At the same instant, of course, vacuum is applied to the inner teat cup chambers through the two leads 31, so that two of the cups are still in released position. At this instant, the vertical passage 41 is uncovered and, as this passage is open to the atmosphere from the interior of the body of the pulsator, such air travels through passage-way 39 to the north and comes up through passages 45 and 46 to get behind the diaphragm 23 in the north diaphragm chamber 25. A little further along in this same movement, vacuum underneath the block 65 is communicated to the vertical passage 44, which travels downwardly to passage 42 to the south and thence through passages 47 and 48 to the south diaphragm chamber 25. Now, we have air in the north diaphragm chamber and vacuum in the south diaphragm chamber, and, as a result, the slide 59 moves instantaneously from the north to the south and, as the guide opening 62 in said plate 59 embraces the valve member 65, obviously the valve member 65 also moves instantaneously to the south in a path at right angles to its first movement from west to east. The milking action is now reversed in this direction of travel of the valve 65.

Now, the valve 65 has traveled to the southeast position on the rest 29, as shown in Figure 6. Here the passage 36 is uncovered and exposed to atmosphere, such air then traveling through duct 51, bore 49, passages 52 and 52′ to the east diaphragm chamber 25. At the same instant, vacuum from opening 35 moves beneath the valve 65 and goes down passage 37 through duct 56, past needle 55 and through passage 57 to the west diaphragm chamber 25. Consequently, with air in the east diaphragm chamber and vacuum in the west diaphragm chamber, the slide 59 with the block 65 must move slowly from the east to the west at right angles to its movement just made from north to south. During this movement, it will be obvious that the right hand nipples 33, as shown in Figure 2, and the leads 31 corresponding therewith will be drawing milk from two of the teat cups. The valve 65 has thus moved slowly to the southwest position shown in Figure 7, where the vertical passage 44, passage 42, deliver air to the south diaphragm chamber while the vertical passage 41 receives vacuum from underneath the valve block 65 and delivers the same through passage 39 and associated passages to the north diaphragm chamber and, as a result, the valve 65 is moved from south to north back to the starting position shown in Figure 4, which movement from south to north again is instantaneous, and the milker action is again reversed in this direction of travel of the valve 65.

In this manner, then, the valve 65 controls the distribution of air and vacuum to the diaphragm chambers to cause its movement in a clockwise direction and in a rectilinear path.

From this detailed disclosure, it must now be apparent that an improved pulsator has been provided, which accomplishes all of the desirable objects heretofore set forth. Obviously, the illustrative example of the invention shown and described is capable of modification without departing from the spirit and scope of the invention, which is expressed in the following claims.

What is claimed is:

1. In a milking machine pulsator, a hollow body open to the atmosphere, means for supplying vacuum to the body, passages adapted to communicate vacuum and atmosphere to teat cups connected with the pulsator, and a single valve member horizontally slidable along a right angular path in the body for controlling the flow of atmosphere and vacuum to the teat cups.

2. In a milking machine pulsator, a hollow body enclosing a rest open to the atmosphere, means for supplying vacuum to the rest, passages in the body adapted to communicate vacuum and atmosphere to teat cups connected with the pulsator, and a single valve member horizontally slidable on the rest in a right angular path for controlling the flow of atmosphere and vacuum to the teat cups.

3. In a milking machine pulsator, a hollow body enclosing a rest open to the atmosphere, means for supplying vacuum to the rest, passages in the body adapted to communicate vacuum and atmosphere to teat cups connected with the pulsator, a single valve member for controlling the flow of atmosphere and vacuum to the teat cups, and slidable guide members for moving the valve member.

4. In a milking machine pulsator, a hollow body enclosing a rest open to the atmosphere, means for supplying vacuum to the rest, passages in the body adapted to communicate vacuum and atmosphere to teat cups connected with the pulsator, a single valve member mounted on the rest for controlling the flow of atmosphere and vacuum to the teat cups, and means for causing movement of the valve member in a right angular path on its rest.

5. In a milking machine pulsator, a hollow body enclosing a rest open to the atmosphere, means for supplying vacuum to the rest, passages in the body adapted to communicate vacuum and atmosphere to teat cups connected with the pulsator, a single valve member slidable on the rest for controlling the flow of atmosphere and vacuum to the teat cups, and air and vacuum operated slides for causing the single valve member to move in a rectilinear path on its rest.

6. In a milking machine pulsator, a hollow body open to the atmosphere, a passage for supplying vacuum to the body, passages adapted to deliver vacuum and atmosphere to teat cups connected with the pulsator, a single valve member for controlling the flow of atmosphere and vacuum to the teat cups, and horizontally reciprocable means operated by air and vacuum to move the valve member along a right angular path.

7. In a milking machine pulsator, a hollow body open to atmosphere, a rest in the body having a passage to deliver vacuum, passages to deliver vacuum and atmosphere to teat cups connected with the pulsator, a slide member, a second slide member, means embodying air and vacuum passages whereby to reciprocate the slide members, and a single valve member on the rest and movable by the slides to regulate flow of air and vacuum to the teat cups and for regulating porting to govern operation of the slide members.

8. In a milking machine pulsator, a hollow body open to atmosphere, a rest in the body having a passage to deliver vacuum, passages to deliver vacuum and atmosphere to teat cups connected with the pulsator, a slide member, a second slide member, said slide members moving crosswise of each other along intersecting axes, means embodying air and vacuum passages whereby to reciprocate the slide members, and a single valve member on the rest and movable by the slides to regulate flow of air and vacuum to the teat cups and for regulating porting to govern operation of the slide members.

9. In a milking machine pulsator, a hollow body open to atmosphere, a rest in the body having a passage to deliver vacuum, passages to deliver vacuum and atmosphere to teat cups connected with the pulsator, a slide member, a second slide member movable at right angles to the first slide member, means embodying air and vacuum passages whereby to reciprocate the slide members, and a single valve member on the rest and movable by the slides to regulate flow of air and vacuum to the teat cups and for regulating porting to govern operation of the slide members, said slide members guiding the valve member along rectilinear lines on said rest.

10. In a milking machine pulsator, a hollow body open to atmosphere, a rest in the body having a passage to deliver vacuum, passages to deliver vacuum and atmosphere to teat cups connected with the pulsator, a slide member, a second slide member, said slide members disposed one above the other and each having a rectangular opening above the rest, means embodying air and vacuum passages whereby to reciprocate the slide members, and a single valve member on the rest embraced by the slide member openings, said valve member being movable by the slides to regulate flow of air and vacuum to the teat cups and for regulating porting to govern operation of the slide members.

11. In a milking machine pulsator, a hollow body open to atmosphere, a rest in the body having a passage to deliver vacuum, passages to deliver vacuum and atmosphere to teat cups connected with the pulsator, a pair of slide members movable crosswise of each other, means embodying air and vacuum passages whereby to reciprocate the slide members, and a single valve member on the rest and embraced by the slide members to be movable by the slides in a rectilinear path to regulate flow of air and vacuum to the teat cups and for regulating porting to govern operation of the slide members.

12. In a milking machine pulsator, a body having four open sides, means supplying air and vacuum to the body, a cap closing each side and enclosing a diaphragm to provide four diaphragm chambers, a pair of relatively movable slide members in the body and connected to said diaphragms, and a valve member in the body guided by the slide members to regulate distribution of air and vacuum to the diaphragm chambers and to teat cups connected with the pulsator.

13. In a milking machine pulsator, a body having four open sides, means supplying air and vacuum to the body, a cap closing each side and enclosing a diaphragm to provide four diaphragm chambers arranged in opposed pairs, a pair of slide members movable crosswise of each other in the body and connected to said diaphragms, and a valve member in the body operated by the slide members to regulate distribution of air and vacuum to the diaphragm chambers and to teat cups connected with the pulsator.

14. In a milking machine pulsator, a body having four open sides, means supplying air and vacuum to the body, a cap closing each side and enclosing a diaphragm to provide four diaphragm chambers arranged in opposed pairs, a pair of slide members reciprocable in the body along intersecting axes and connected to said diaphragms, and a valve member in the body movable along a rectilinear path by the slide members to regulate distribution of air and vacuum to the diaphragm chambers and to teat cups connected with the pulsator.

15. In a milking machine pulsator, a body having four open sides, means supplying air and vacuum to the body, a cap closing each side and enclosing a diaphragm to provide four diaphragm chambers, a pair of relatively movable slide members in the body and connected to said diaphragms, each slide member having an opening therein, and a valve member supported in the body and embraced by said openings, whereby the slide members guide the valve to regulate distribution of air and vacuum to the diaphragm chambers and to teat cups connected with the pulsator.

16. In a milking machine pulsator, a body having four open sides, means supplying air and vacuum to the body, a cap closing each side and enclosing a diaphragm to provide four diaphragm chambers arranged in opposed pairs, a pair of slide members movable crosswise of each other in the body and each connected to a pair of diaphragms, and a valve member in the body guided by the slide members to move in a rectilinear path to regulate distribution of air and vacuum to the diaphragm chambers and to teat cups connected with the pulsator.

17. In a milking machine pulsator, a body having four open sides, means supplying air and vacuum to the body, a cap closing each side and enclosing a diaphragm to provide four diaphragm chambers arranged in opposed pairs, a pair of slide members movable crosswise of each other in the body and each connected to a pair of diaphragms, passages to deliver air or vacuum to the chambers, and a valve member in the body operated by the slide members in a rectilinear path to regulate distribution of air and vacuum through the passages to the diaphragm chambers and to teat cups connected with the pulsator.

In testimony whereof I affix my signature.

FLOYD G. HODSDON.